(12) United States Patent
Ogata et al.

(10) Patent No.: US 9,304,201 B2
(45) Date of Patent: Apr. 5, 2016

(54) IMAGE DETECTION DEVICE, AND IMAGE FORMING APPARATUS

(71) Applicant: FUJI XEROX CO., LTD., Tokyo (JP)

(72) Inventors: Kenta Ogata, Kanagawa (JP); Makoto Hamatsu, Kanagawa (JP); Shoji Yamauchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/467,689

(22) Filed: Aug. 25, 2014

(65) Prior Publication Data

US 2015/0227103 A1 Aug. 13, 2015

(30) Foreign Application Priority Data

Feb. 13, 2014 (JP) .................................. 2014-025089

(51) Int. Cl.
| | | |
|---|---|---|
| *G03G 15/00* | (2006.01) | |
| *G01S 17/02* | (2006.01) | |
| *G01S 17/88* | (2006.01) | |
| *G01S 7/481* | (2006.01) | |
| *G01S 7/497* | (2006.01) | |

(52) U.S. Cl.
CPC ............... *G01S 17/026* (2013.01); *G01S 7/481* (2013.01); *G01S 7/497* (2013.01); *G01S 17/88* (2013.01); *G03G 15/5058* (2013.01); *G03G 15/5041* (2013.01); *G03G 15/556* (2013.01); *G03G 2215/00029* (2013.01); *G03G 2215/0132* (2013.01); *G03G 2215/0164* (2013.01)

(58) Field of Classification Search
CPC ............ G03G 15/5041; G03G 15/556; G03G 2215/00029; G01N 2021/556; G01N 21/55; G01N 2021/4735
See application file for complete search history.

(56) References Cited

U.S. PATENT DOCUMENTS

| | | | |
|---|---|---|---|
| 2002/0051648 A1 | 5/2002 | Shimomura et al. | |
| 2004/0251435 A1 | 12/2004 | Sawayama et al. | |
| 2008/0170220 A1 | 7/2008 | Sawayama et al. | |
| 2008/0292360 A1* | 11/2008 | Hirai | .............................. 399/220 |
| 2011/0091235 A1* | 4/2011 | Oh | .................................. 399/74 |

FOREIGN PATENT DOCUMENTS

| | | |
|---|---|---|
| JP | A-2002-55572 | 2/2002 |
| JP | A-2002-162803 | 6/2002 |
| JP | B2-3661446 | 6/2005 |
| JP | B2-4154272 | 9/2008 |
| JP | A-2011-107524 | 6/2011 |

\* cited by examiner

*Primary Examiner* — Matthew G Marini
*Assistant Examiner* — John M Royston
(74) *Attorney, Agent, or Firm* — Oliff PLC

(57) ABSTRACT

Provided is an image detection device including a light-emitting unit that emits light toward an image holding member, a first light-receiving unit that is disposed at a position where specular reflected light of the light emitted toward the image holding member is received, a second light-receiving unit that is disposed at a position where diffuse reflected light of the light emitted toward the image holding member is received, a light-emission control unit that controls an intensity of the light emitted by the light-emitting unit, and a reference member that is disposed at a position through which light having an intensity that is less than an intensity detectable by the second light-receiving unit passes in a case of the first intensity and through which light having an intensity that is equal to or higher than the intensity detectable by the second light-receiving unit passes in a case of the second intensity.

8 Claims, 4 Drawing Sheets

IMAGE DETECTION DEVICE, AND IMAGE FORMING APPARATUS

CROSS-REFERENCE TO RELATED APPLICATIONS

This application is based on and claims priority under 35 USC 119 from Japanese Patent Application No. 2014-025089 filed Feb. 13, 2014.

BACKGROUND

Technical Field

The present invention relates to an image detection device, and an image forming apparatus.

SUMMARY

According to an aspect of the invention, there is provided an image detection device including:
a light-emitting unit that emits light toward an image holding member in which an image is held on a surface;
a first light-receiving unit that is disposed at a position where specular reflected light of the light emitted toward the image holding member is received;
a second light-receiving unit that is disposed at a position where diffuse reflected light of the light emitted toward the image holding member is received and detects light having an intensity that is equal to or higher than a predetermined intensity;
a light-emission control unit that controls an intensity of the light emitted by the light-emitting unit, controls the intensity of the light emitted by the light-emitting unit to a first intensity that is predetermined in a case where the image held on the image holding member is detected, and controls the intensity of the light emitted by the light-emitting unit to a second intensity that is higher than the first intensity in a case where a reference of a density is detected; and
a reference member that is disposed at a position through which light having an intensity that is less than an intensity detectable by the second light-receiving unit passes in a case of the first intensity and through which light having an intensity that is equal to or higher than the intensity detectable by the second light-receiving unit passes in a case of the second intensity, and includes a reference surface that reflects the light emitted by the light-emitting unit toward the second light-receiving unit in the case of the second intensity and has a density that is a predetermined reference.

BRIEF DESCRIPTION OF THE DRAWINGS

Exemplary embodiments of the present invention will be described in detail based on the following figures, wherein.

DETAILED DESCRIPTION

Specific examples of exemplary embodiments (hereinafter, referred to as Examples) of the invention will now be described with reference to the drawings, but the invention is not limited to the following Examples.

In addition, for ease of understanding of the following description, in the figures, a forward and backward direction is referred to as an X-axis direction, a left and right direction is referred to as a Y-axis direction, an up and down direction is referred to as a Z-axis direction. In addition, directions or sides indicated by the arrows X, -X, Y, -Y, Z, and -Z are respectively referred to as forward, backward, right, left, upward, and downward, or front side, rear side, right side, left side, upper side, and lower side.

In the figures, "•" described in "○" means an arrow directed from the rear to the front of the figure, and "X" described in "○" means an arrow directed from the front to the rear of the figure.

Furthermore, in the description which uses the following figures, for ease of understanding, illustration of members other than necessary members for the description will be appropriately omitted.

[Example 1]

Figure 1:
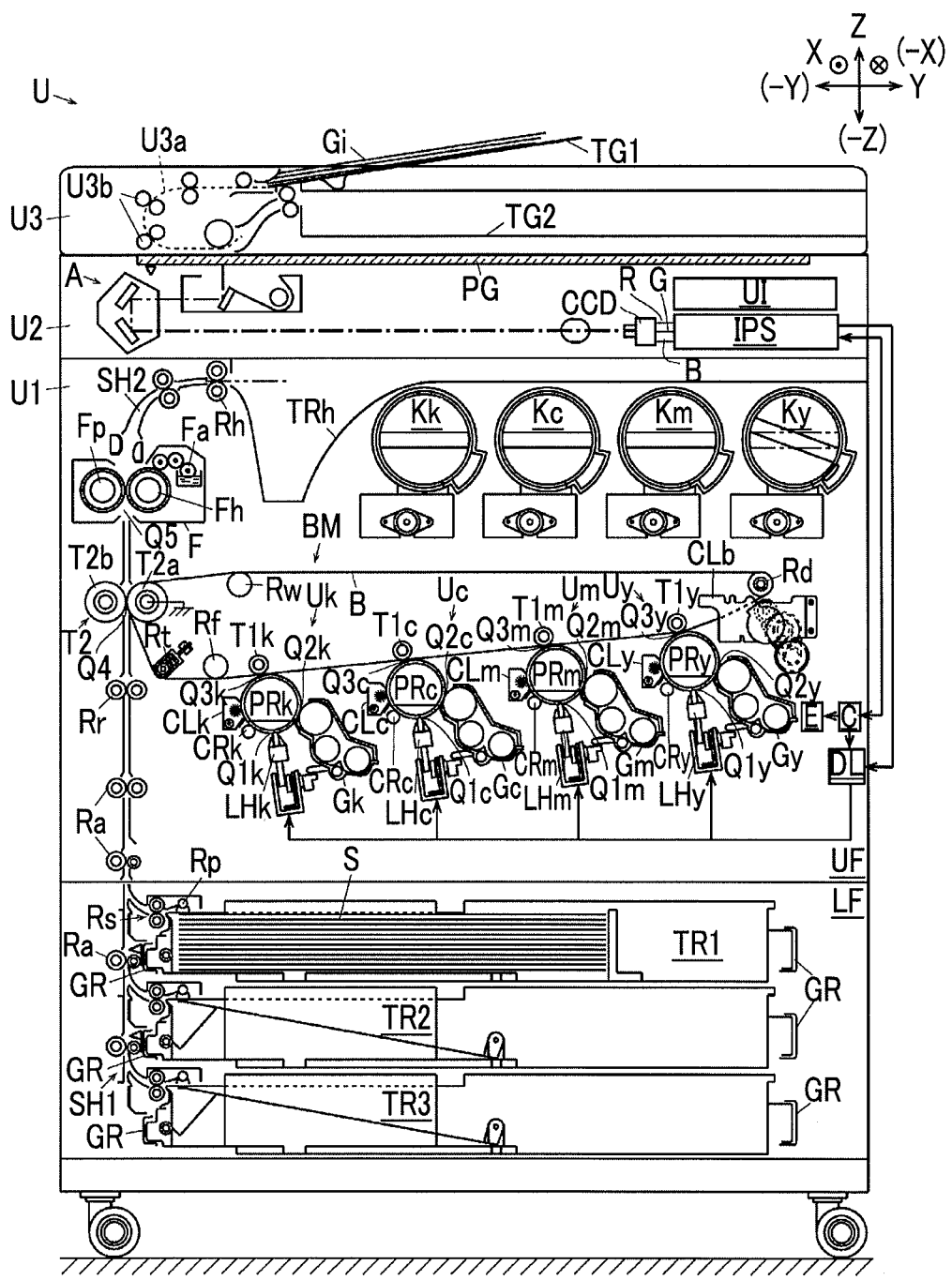
FIG. 1 is an overall explanatory view of an image forming apparatus of Example 1.

FIG. 1 is an overall explanatory view of an image forming apparatus of Example 1.

In FIG. 1, a copying machine U as an example of the image forming apparatus of Example 1 is an example of a recording unit and includes a printer section U1 as an example of an image recording apparatus. On the upper portion of the printer section U1, a scanner section U2 that is an example of a reading unit and is an example of an image reading apparatus is supported. On the upper portion of the scanner section U2, an automatic feeder U3 that is an example of a document feeding apparatus is supported. In the scanner section U2 of Example 1, a user interface UI that is an example of an input unit is supported. The user interface UI accepts input from an operator so as to operate the copying machine U.

In the upper portion of the automatic feeder U3, a document tray TG1 as an example of a medium accommodating container is disposed. The document tray TG1 may accommodate sheets of documents Gi that are overlapped so as to be copied. In the lower portion of the document tray TG1, a document discharge tray TG2 is formed as an example of a document discharge unit. A document transport roll U3b is disposed between the document tray TG1 and the document discharge tray TG2 along a document transport path U3a.

On the upper surface of the scanner section U2, a platen glass PG as an example of a transparent document platen is disposed. In the scanner section U2 of Example 1, an optical system A for reading is disposed below the platen glass PG. The optical system A for reading of Example 1 is supported to be movable in the left and right direction along the lower surface of the platen glass PG. In addition, the optical system A for reading is typically stopped at an initial position illustrated in FIG. 1.

On the left of the optical system A for reading, an imaging member CCD is disposed. An image processing unit IPS is electrically connected to the imaging member CCD.

The image processing unit IPS is electrically connected to a writing circuit DL of the printer section U1. The writing circuit DL is an example of a latent image forming device and is electrically connected to LED heads LHy, LHm, LHc, and LHk as an example of an exposure device.

The LED heads LHy, LHm, LHc, and LHk of Example 1 are disposed to respectively correspond to Y, M, C, and K colors. The LED heads LHy to LHk of Example 1 are configured as an LED array in which LEDs as an example of a light-emitting device are arranged in a line pattern along the width direction of an image. The LED heads LHy to LHk are configured to enable the LEDs to emit light according to input signals. That is, the LED heads LHy to LHk are configured to output writing light according to the input signals.

In FIG. 1, on the upper sides of the LED heads LHy to LHk, photoconductors PRy, PRm, PRc, and PRk as an example of an image holding member are respectively disposed. Writing regions Q1y, Q1m, Q1c, and Q1k are formed by regions where the photoconductors PRy to PRk respectively oppose the LED heads LHy to LHk.

On the upstream sides of the LED heads LHy to LHk in the rotation directions of the photoconductors PRy, PRm, PRc, and PRk, charging rolls CRy, CRm, CRc, and CRk as an example of a charging unit are respectively disposed. The charging rolls CRy to CRk of Example 1 are supported to come into contact and follow the photoconductors PRy to PRk so as to rotate.

On the downstream sides of the LED heads LHy to LHk in the rotation directions of the photoconductors PRy to PRk, developing devices Gy, Gm, Gc, and Gk are respectively disposed. Developing regions Q2y, Q2m, Q2c, and Q2k are formed by regions where the photoconductors PRy to PRk respectively oppose the developing devices Gy to Gk.

On the downstream sides of the developing devices Gy to Gk in the rotation directions of the photoconductors PRy to PRk, first transfer rolls T1y, T1m, T1c, and T1k are respectively disposed as an example of a first transfer unit. First transfer regions Q3y, Q3m, Q3c, and Q3k are formed by regions where the photoconductors PRy to PRk respectively oppose the first transfer rolls T1y to T1k.

On the downstream sides of the first transfer rolls T1y to T1k in the rotation directions of the photoconductors PRy to PRk, photoconductor cleaners CLy, CLm, CLc, and CLk as an example of a cleaning unit of the image holding member are respectively disposed.

A Y-color image forming section Uy as an example of a Y-color visible image forming device of Example 1 in which a toner image is formed as an example of a visible image is constituted by the photoconductor PRy for Y color, the charging roll CRy, the LED head LHy, the developing device Gy, the first transfer roll T1y, and the photoconductor cleaner CLy. In the same manner, M-, C-, and K-color image forming sections Um, Uc, and Uk are respectively constituted by the photoconductors PRm, PRc, and PRk, the charging rolls CRm, CRc, and CRk, the LED heads LHm, LHc, and LHk, the developing devices Gm, Gc, and Gk, the first transfer rolls T1m, T1c, and T1k, and the photoconductor cleaners CLm, CLc, and CLk.

On the upper sides of the photoconductors PRy to PRk, a belt module BM as an example of an intermediate transfer device is disposed. The belt module BM is an example of an image holding member and has an intermediate image transfer belt B as an example of an intermediate transfer member. The intermediate image transfer belt B is formed by an endless band-like member.

The intermediate image transfer belt B of Example 1 is rotatably supported by a belt driving roll Rd as an example of a driving member, a tension roll Rt as an example of a tension member, a walking roll Rw as an example of a member for correcting skewing, a idler roll Rf as an example of a following member, a backup roll T2a as an example of a counter member of a secondary transfer region, and the first transfer rolls T1y, T1m, T1c, and T1k.

A secondary transfer roll T2b as an example of a secondary transfer member is disposed at a position that opposes the backup roll T2a with the intermediate image transfer belt B interposed therebetween. In Example 1, the backup roll T2a is grounded, and a secondary transfer voltage having an opposite polarity to the charge polarity of toner is applied to the secondary transfer roll T2b from a power source circuit E. A secondary transfer unit T2 of Example 1 is constituted by the backup roll T2a and the secondary transfer roll T2b. Further, a secondary transfer region Q4 is formed by a region where the secondary transfer roll T2b and the intermediate image transfer belt B come into contact with each other.

On the downstream side of the secondary transfer region Q4 in the rotation direction of the intermediate image transfer belt B, a belt cleaner CLb as an example of a cleaning unit of the intermediate transfer member is disposed.

A transfer device T1+T2+B of Example 1 is constituted by the first transfer rolls T1y to T1k, the intermediate image transfer belt B, the secondary transfer unit T2, and the like. In addition, image recording sections Uy to Uk+T1+T2+B of Example 1 are constituted by the image forming sections Uy to Uk and the transfer device T1+T2+B.

In FIG. 1, below the image forming sections Uy to Uk, a pair of left and right guide rails GR as an example of a guiding member are provided in each of three stages. Paper supplying trays TR1 to TR3 as an example of a medium accommodating unit are supported by the guide rails GR so as to enter and exit in the forward and backward direction. In the paper supplying trays TR1 to TR3, recording sheets S as an example of a medium are accommodated.

On the upper left of the paper supplying trays TR1 to TR3, a pickup roll Rp as an example of an unloading member is disposed. On the downstream side of the pickup roll Rp in the transfer direction of the recording sheet S, a separating roll Rs as an example of a separating member is disposed. On the downstream side of the separating roll Rs in the transfer direction of the recording sheet S, a paper supplying path SH1 that extends upward is formed as an example of a medium transport path. In the paper supplying path SH1, two or more transport rolls Ra are disposed as an example of a transporting member.

On the upstream side of the secondary transfer region Q4 in the paper supplying path SH1, a registration roll Rr as an example of a transport time adjusting member is disposed.

On the downstream side of the secondary transfer region Q4 in the transfer direction of the sheet S, a fixing device F is disposed. The fixing device F includes a heating roll Fh as an example of a fixing member for heating and a press roll Fp as an example of a fixing member for pressing. A fixing region Q5 is formed by a region where the heating roll Fh and the press roll Fp come into contact with each other.

Above the fixing device F, a discharge path SH2 as an example of a transport path is disposed. On the upper surface of the printer section U1, a discharge tray TRh as an example of a medium discharge unit is formed. The discharge path SH2 extends toward the discharge tray TRh. At the downstream end of the discharge path SH2, a discharge roll Rh as an example of a medium transporting member is disposed.

(Description of Image Forming Operation)

In the copying machine U of Example 1 having the above-described configuration, when a copying operation is started, the sheets of documents Gi accommodated in the document tray TG1 sequentially pass through a document reading position on the platen glass GL and are discharged to the document discharge tray TG2.

In a case where copying is performed by automatically transporting the documents using the automatic feeder U3, each of the documents Gi that sequentially pass through the reading position on the platen glass PG is exposed in a state where the optical system A for reading is stopped at the initial position. In a case where copying is performed by placing the documents Gi on the platen glass PG with an operator's hand, the optical system A for reading moves in the left and right direction so that the documents on the platen glass PG are scanned while being exposed.

The reflected light from the documents Gi passes through the optical system A and is converged by the imaging member CCD. The imaging member CCD converts the reflected light from the documents Gi, which is converged by the imaging surface, into an electrical signal.

The electrical signal output from the imaging member CCD is input to the image processing unit IPS. The image processing unit IPS converts the electrical signal of an image of R, G, and B colors read by the imaging member CCD, into image information of yellow Y, magenta M, cyan C, and black K for forming a latent image. The image processing unit IPS outputs the image information after the conversion to the writing circuit DL of the printer section U1. In addition, the image processing unit IPS outputs image information of only black K to the writing circuit DL in a case where the image is a single-color image, a so-called monochromatic image.

The writing circuit DL outputs a control signal according to the input image information to the LED heads LHy to LHk. The LED heads LHy to LHk output writing light according to the control signal.

Each of the photoconductors PRy to PRk is driven to rotate when image formation is started. A charging voltage is applied to the charging rolls CRy to CRk from the power source circuit E. Therefore, the surfaces of the photoconductors PRy to PRk are charged by the charging rolls CRy to CRk. Electrostatic latent images are formed in the writing regions Q1y to Q1k on the surfaces of the charged photoconductors PRy to PRk by the writing light from the LED heads LHy to LHk. The electrostatic latent images on the photoconductors PRy to PRk are developed into toner images as an example of a visible image in the developing regions Q2y to Q2k by the developing devices Gy, Gm, Gc, and Gk.

The developed toner images are transported to the first transfer regions Q3y, Q3m, Q3c, and Q3k that come into contact with the intermediate image transfer belt B. In the first transfer regions Q3y, Q3m, Q3c, and Q3k, a first transfer voltage having an opposite polarity to the charge polarity of toner is applied to the first transfer rolls T1y to T1k from the power source circuit E. Therefore, the toner image on each of the photoconductors PRy to PRk is transferred onto the intermediate image transfer belt B by the first transfer rolls T1y to T1k. In a case of a polychromatic toner image, a toner image on the downstream side is transferred to overlap a toner image transferred onto the intermediate image transfer belt B in the first transfer region on the upstream side.

Residues and adhering matters on the photoconductors PRy to PRk after the first transfer are cleaned by the photoconductor cleaners CLy to CLk. The cleaned surfaces of the photoconductors PRy to PRk are re-charged by the charging rolls CRy to CRk.

The monochromatic or polychromatic toner image transferred onto the intermediate image transfer belt B in the first transfer regions Q3y to Q3k by the first transfer rolls T1y to T1k is transported to the secondary transfer region Q4.

A sheet S on which the image is to be recorded is unloaded by the pickup roll Rp of the paper supplying trays TR1 to TR3 in use. In a case where two or more sheets S are unloaded while overlapping, the sheets S unloaded by the pickup roll Rp are separated one by one by the separating roll Rs. The sheets S separated by the separating roll Rs are transported to the paper supplying path SH1 by the transport roll Ra. The sheet S transported to the paper supplying path SH1 is sent to the registration roll Rr.

The registration roll Rr transports the sheet S to the secondary transfer region Q4 according to the time at which the toner image formed on the intermediate image transfer belt B is transported to the secondary transfer region Q4. The secondary transfer voltage having an opposite polarity to the charge polarity of toner is applied to the secondary transfer roll T2b from the power source circuit E. Therefore, the toner image on the intermediate image transfer belt B is transferred to the sheet S from the intermediate image transfer belt B.

Adhering matter and the like that adhere to the surface of the intermediate image transfer belt B after the secondary transfer are cleaned by the belt cleaner CLb.

The recording sheet S on which the toner image is secondarily transferred is thermally fixed when passing through a fixing region Q5.

The recording sheet S on which the image is fixed is transported to the discharge path SH2. The sheet S transported to the discharge path SH2 is discharged to the discharge tray TRh by the discharge roll Rh.

(Description of Image Sensor)

Figure 2:
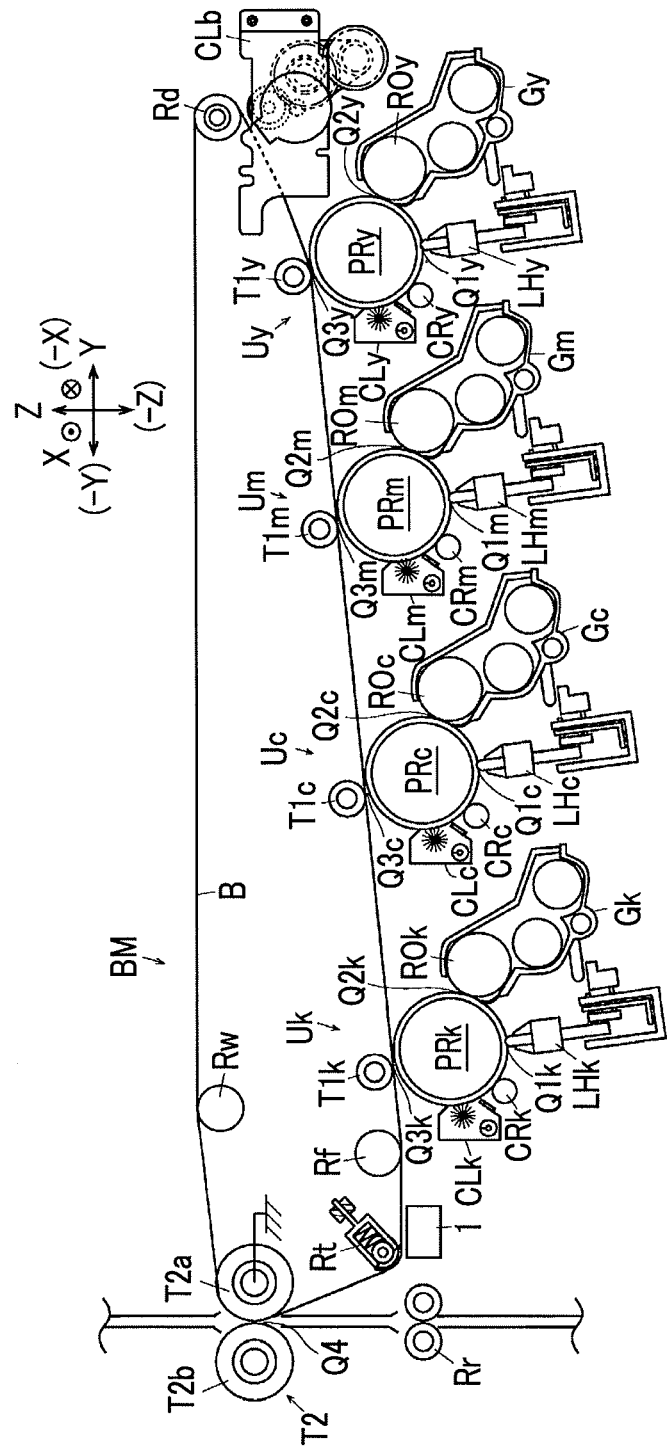
FIG. 2 is an explanatory view of a part of the image forming apparatus of Example 1.

FIG. 2 is an explanatory view of a part of the image forming apparatus of Example 1.

Figure 3:
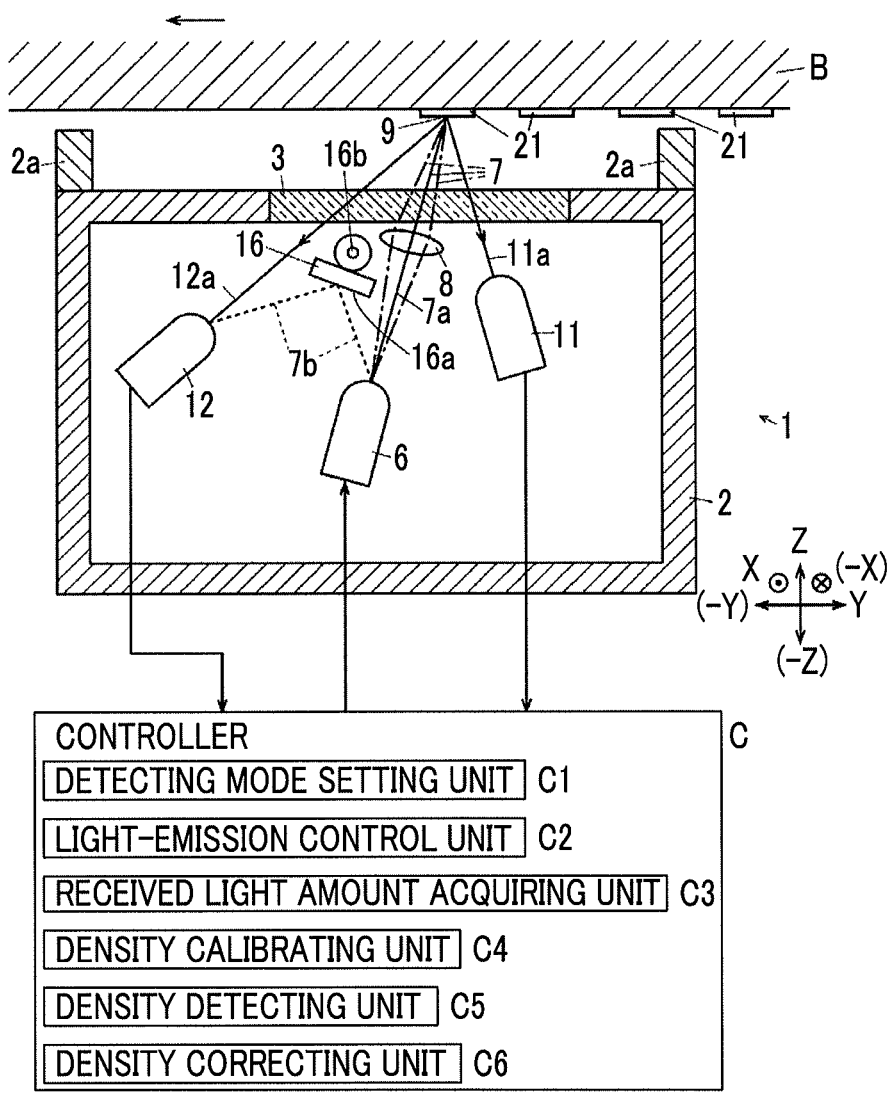
FIG. 3 is an explanatory view of an image detection device of Example 1.

FIG. 3 is an explanatory view of an image detection device of Example 1.

In FIG. 2, on the downstream side of the first transfer roll T1k for K color and on the upstream side of the backup roll T2a in the rotation direction of the intermediate image transfer belt B, an image sensor 1 as an example of the image detection device is disposed. In addition, the image sensor 1 of Example 1 is disposed at an end portion of the intermediate image transfer belt B in the width direction.

In FIG. 3, the image sensor 1 of Example 1 has a housing 2 as an example of a member. The housing 2 supports a window portion 3 as an example of a light passing unit on the upper surface that opposes the intermediate image transfer belt B. In addition, on both the left and right sides of the window portion 3, covers 2a as an example of a shield unit are formed. The cover 2a is formed in a wall shape that protrudes toward the intermediate image transfer belt B. The cover 2a has a function of suppressing toner, paper powder, and the like that ride on the air stream from the upstream or downstream side of the intermediate image transfer belt B from flowing toward the window portion 3 and adhering to the window portion 3.

In the housing 2, an LED 6 as an example of a light-emitting unit is supported. The LED 6 emits light 7 for detecting toward the surface of the intermediate image transfer belt B through the window portion 3. In addition, the LED 6 of Example 1 is configured to output the light 7 having an intensity corresponding to a supplied current value.

A lens 8 as an example of an optical member is disposed between the LED 6 and the window portion 3. The lens 8 converges the light 7 emitted by the LED 6 to a predetermined detection position 9 on the surface of the intermediate image transfer belt B.

On the right of the LED 6 in the housing 2, a first photodiode 11 as an example of a first light-receiving unit is supported. The first photodiode 11 is disposed to correspond to a position on which the light 7 emitted by the LED 6 and specularly reflected from the surface of the intermediate image transfer belt B, that is, specular reflected light 11a is incident.

On the left of the LED 6 in the housing 2, a second photodiode 12 as an example of a second light-receiving unit is supported. The second photodiode 12 is configured to detect the light 7 emitted by the LED 6 and diffusely scattered from the surface of the intermediate image transfer belt B, that is, diffuse reflected light 12a.

In the left and right direction, an internal reference plate 16 as an example of a reference member is disposed between the LED 6 and the second photodiode 12. The internal reference plate 16 is disposed at a position shifted toward the second photodiode 12 with respect to an optical axis 7a of the light 7 emitted by the LED 6. Specifically, the internal reference plate 16 is disposed at a position through which light 7b having an intensity less than an intensity detectable by the second photodiode 12 passes in a case where the light 7 emitted by the LED 6 is light having a first intensity which is emitted when the image on the surface of the intermediate image transfer belt B is read, and through which the light 7b having an intensity equal to or higher than the intensity detectable by the second photodiode 12 passes in a case where the light 7 emitted by the LED 6 is light having a second intensity that is higher than the first intensity.

Figure 4:
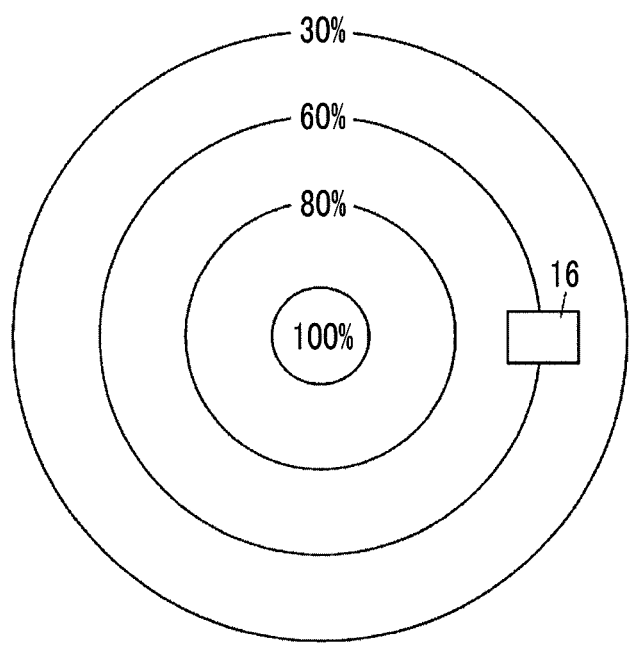
FIG. 4 is an explanatory view of a part of the intensities of light of Example 1.

FIG. 4 is an explanatory view of a part of the intensities of the light of Example 1.

In FIG. 4, in Example 1, the light 7 emitted by the LED 6 has a light intensity that reduces toward the radially outer side from the optical axis 7a as the center, and the second photodiode 12 is configured to detect the diffuse reflected light 12a of the light 7 having a light intensity of, for example, 70% or higher. In addition, the internal reference plate 16 is disposed at a position through which the light 7b having a light intensity of about 60% as an example of the light having an intensity non-detectable by the second photodiode 12 passes in the case of the first intensity. In addition, the internal reference plate 16 of Example 1 has a reflecting surface 16a that specularly reflects the light 7b from the LED 6 toward the second photodiode 12. The reflecting surface 16a is coated at a predetermined reference density that becomes the reference for density measurement.

The internal reference plate 16 is rotatably supported centered on a rotation center 16b. Therefore, the angle of the reflecting surface 16a may be adjusted so that the light 7b from the LED 6 is reflected toward the second photodiode 12. That is, the internal reference plate 16 of Example 1 may be adjusted according to the difference in angle, range, and the like of the light 7b due to the individual difference, production lot difference, and the like of the LED 6.

(Description of Controller C)

In FIG. 3, the image detecting sensor 1 of Example 1 transmits/receives signals between the copying machine U and a controller C. The controller C of Example 1 is configured as a small information processing device, a so-called microcomputer, is also configured as a computer as an example of a calculator including an I/O that inputs and outputs signals to and from the outside and controls the levels of the input and output signals and the like, a program for executing necessary processes, a ROM that stores data and the like, a RAM or HDD for temporarily stores necessary data, a CPU that executes processes according to the program stored in the ROM or the HDD, a clock oscillator, and the like, and may realize various functions by executing the program stored in the ROM.

The controller C has following functional units C1 to C6.

A detecting mode setting unit C1 as an example of a detecting operation setting unit sets settings for detecting an image. The detecting mode setting unit C1 of Example 1 sets an image detecting mode according to an image region that passes through the detection position 9 during an image forming operation, and sets a density calibrating mode according to a region between images of one page to be printed, a so-called interimage region.

A light-emission control unit C2 controls the intensity of the light 7 emitted by the LED 6. The light-emission control unit C2 of Example 1 controls the intensity of the light 7 emitted by the LED 6 to the first intensity in a case of the image detecting mode in which the image held by the intermediate image transfer belt B is detected. In addition, the light-emission control unit C2 of Example 1 controls the intensity of the light 7 emitted by the LED 6 to the second intensity that is higher than the first intensity in a case of a calibration mode in which the density of the internal reference plate 16 is detected and calibration of the density is performed. Specifically, the light-emission control unit C2 of Example 1 sets the current value of the current supplied to the LED 6 to a first current value that is predetermined at the first intensity and sets the current value to a current value that is twice the first current value at the second intensity. In Example 1, as an example, the first current value is set to 5 mA, and the second current value is set to 10 mA.

A received light amount acquiring unit C3 acquires the received light amounts of the first and second photodiodes 11 and 12. The received light amount acquiring unit C3 of Example 1 acquires the received light amount of the specular reflected light which is the received light amount of the first photodiode 11 and the received light amount of the diffuse reflected light which is the received light amount of the second photodiode 12 from the respective photodiodes 11 and 12.

A density calibrating unit C4 as an example of an output calibrating unit calibrates the density detected by the second photodiode 12 on the basis of V3 which is the output value of the second photodiode 12 and the density of the internal reference plate 16 stored in advance, in the case of the density calibrating mode. That is, according to a change in the output value due to the deterioration of the second photodiode 12 caused by aging, temperature increase, and the like, the newest output value V3 is calibrated to an output value corresponding to the density of the internal reference plate 16. In addition, in the density calibrating unit C4 of Example 1, when the calibration of the second photodiode 12 is performed to detect the density of the image of Y, M, and C colors by using the internal reference plate 16, the calibration of the first photodiode 11 is also performed to detect the density of the image of K color on the basis of the specular reflected light from the surface of the intermediate image transfer belt B where the image is not held. That is, the newest output value V3a of the specular reflected light from the surface of the intermediate image transfer belt B is calibrated to an output value corresponding to the absence of the image, that is, a density of zero.

A density detecting unit C5 detects the density of the image held on the surface of the intermediate image transfer belt B on the basis of an output value V1a of the specular reflected light from the first photodiode 11 and an output value V1 of the diffuse reflected light from the second photodiode 12. In addition, in the image detecting mode, a density detecting image of Y, M, C, and K that is predetermined, the so-called patch image 21 is formed at a position corresponding to the image sensor 1 and the image is irradiated with the light 7 having the first intensity. In Example 1, regarding the image of black (K) color, as the density of the image increases, light is absorbed by toner, and the output value V1a of the specular reflected light decreases. On the other hand, regarding the image in Y, M, and C, at a high density, the output value V1a of the specular reflected light becomes too high and the output value V1a is saturated, resulting in the degradation of density detection accuracy. Therefore, the density detecting unit C5 of Example 1 detects the density of the patch image 21 of black color on the basis of the output value V1a of the first photodiode 11.

In contrast, regarding the image of Y, M, and C, as the density of the image increases, the output value V1 of the diffuse reflected light as an example of a first detection value is substantially proportionally increases, while the output value V1a of the specular reflected light becomes too high at a high density and the output value V1a is likely to be saturated. Therefore, when the density of the Y, M, and C colors is detected by using the output value V1a of the specular reflected light, accuracy is likely to be degraded. Accordingly, the density detecting unit C5 of Example 1 detects the density of the patch image 21 of Y, M, and C on the basis of the output value V1 of the second photodiode 12. Furthermore, the density detecting unit C5 of Example 1 detects the density of the patch image 21 on the basis of the output values V1a and V1 of the photodiodes 11 and 12.

Moreover, the density detecting unit C5 of Example 1 acquires output values V2a and V2 from the surface of the intermediate image transfer belt B before and after the patch image 21 as an example of a second detection value, in addition to the output values V1 and V1a from the patch image 21 of Y, M, C, and K. The density detecting unit C5 calculates a density V4a of the patch image 21 of K color and a density V4 of the patch image 21 of Y, M, and C colors by subtracting the output values V2a and V2 which are reflected light components from the intermediate image transfer belt B included in the output values V1a and V1 from the patch image 21 and performing normalization using the output values V3a and V3 measured during the density calibration as an example of a third output value. That is, the density V4a of the K color and the density V4 of the Y, M, and C colors are calculated by the following expressions (1) and (2).

$$V4a = (V1a - V2a)/V3a \quad \text{Expression (1)}$$

$$V4 = (V1 - V2)/V3 \quad \text{Expression (2)}$$

In addition, when the photodiodes 11 and 12 are electrically conducted, outputs having small values, so-called dark voltages V5a and V5 may be observed even in a state where the LED 6 does not emit light. The dark voltages V5a and V5 are observed in forms included in the output values V1, V1a, V2, V2a, V3, and V3a. Therefore, in a case where measurement with higher accuracy is needed, instead of Expressions (1) and (2), the following Expressions (1') and (2') may be used to calculate the densities V4a and V4.

$$V4a = (V1a - V2a)/(V3a - V5a) \quad \text{Expression (1')}$$

$$V4 = (V1 - V2)/(V3 - V5) \quad \text{Expression (2')}$$

In the numerators of the right sides, V5a included in the V1a and V2a and V5 included in V1 and V2 are canceled by subtraction.

A density correcting unit C6 corrects the density of the image to be printed on the basis of the difference between the actual densities V4a and V4 detected by the density detecting unit C5 and the density set when the patch image 21 is formed. In addition, the copying machine U of Example 1 adjusts and controls any one, some, or all of the charging voltages of the charging rolls CRy to CRk, the outputs of the LED heads LHy to LHk, and the developing voltages of the developing devices Gy to Gk on the basis of the densities corrected by the density correcting unit C6 and forms images. In addition, the density correction is not limited thereto, and the density correction may also be performed by adjusting an image density in input data of an image to be printed, or performing gradation correction or the like.

(Action of Image Detecting Sensor)

In the image sensor 1 of Example 1 having the above-described configuration, the first current value is supplied to the LED 6 in a case where reading of the patch image 21 is performed. Therefore, the patch image 21 is irradiated with the light 7 having the first intensity to detect the density. At this time, the reflected light from the internal reference plate 16 is light having an intensity that is less than the intensity detectable by the second photodiode 12. Therefore, in the second photodiode 12, the density of the patch image 21 is detected with almost no influence of the density of the internal reference plate 16.

In the case where the density calibration is performed, the second current value is supplied to the LED 6. Therefore, the light 7 having the second intensity that is higher than the first intensity is emitted by the LED 6. Accordingly, the intensity of the light 7b reflected on the internal reference plate 16 also increases and may be detected by the second photodiode 12. Conceptually, when light through the optical axis 7a at the first intensity is assumed to be the reference (100%), the light 7b reflected on the internal reference plate 16 has an intensity that is less than the intensity (70%) detectable by the second photodiode 12 at the first intensity (60%). However, at the second intensity (60%×2=120%), the intensity of the light 7b exceeds the detectable intensity (70%) and thus the density of the internal reference plate 16 may be detected by the second photodiode 12. In addition, in the case of performing the density calibration, the intensity of the light 7 that irradiates the intermediate image transfer belt B also increases. However, in a state where the patch image 21 is not held, specular reflection occurs on the surface of the intermediate image transfer belt B and the diffuse reflected light is rarely observed by the second photodiode 12. Therefore, the second photodiode 12 may perform calibration on the basis of the reflected light 7b from the internal reference plate 16 with almost no influence of the reflected light from the surface of the intermediate image transfer belt B. Moreover, the first photodiode 11 may perform calibration on the basis of the reflected light 11a from the intermediate image transfer belt B.

Here, as in the related art, when density detection is to be performed by an optical system using only one of specular reflected light and diffuse reflected light, there is a problem in that the accuracy of the density of Y, M, and C decreases. Therefore, as in Example 1 or in the related art, accuracy is enhanced when density measurement is performed by using both specular reflected light and diffuse reflected light.

In the configuration in the related art, description regarding an internal reference plate is not provided. In a case where the internal reference plate is not provided, there are problems in that deterioration of the photodiodes 11 and 12 due to aging, contamination, and the like does not be coped with, and accuracy is degraded. A configuration having a shutter for opening and closing the window portion 3 in order to cope with the contamination and the like of the window portion 3 is known, and a configuration provided with an internal reference plate on the inside of a shutter is also known. However, in the configurations, there is concern that a mechanism that opens and closes the shutter may be broken. Particularly, when the movement speed of the shutter is increased or an opening and closing frequency thereof is increased, the possibility of breakage increases. When the calibration is performed on the interimage region which passes through the detection position 9 within a short time as in Example 1 without stopping the image forming operation, there is a need to open and close the shutter at a high speed and a high frequency. When a calibration-dedicated operation is performed by stopping the image forming operation, the opening and closing speed or frequency of the shutter may be suppressed. However, there is a problem in that the number of printed sheets per unit time, that is, productivity is degraded.

In the configuration in the related art, a configuration of controlling a light-emitting intensity of the light-emitting device is not provided, and even when the reflected light from the patch image or the surface of the belt is detected, the reflected light is detected in a state where an output from the reference reflecting surface is always included. Therefore, there are problems in that it is difficult to obtain the output of only the reference reflecting surface, and calibration or density detection accuracy is deteriorated. That is, in order to apply the configuration in the related art to an actual machine, density detection sensitivity and the output of the internal reference plate are secured by limiting the output range of the internal reference plate. There is a so-called trade-off between the density detection sensitivity and the output of the internal reference plate. In addition, the amount of light from the reference reflecting surface is acquired by adjusting an optical path. However, it is very difficult for this configuration to cope with individual differences and the like between the light-emitting device and the light-receiving device. Therefore, the amount of reflected light from the reference reflecting surface varies with individuals, and there is a problem in that calibration accuracy and density detection accuracy are degraded.

Contrary to this, in the image sensor 1 of Example 1, each of the values V1 to V4 and V1a to V4a may be acquired and calculated only by changing the light-emitting intensity of the LED 6 between the time of detecting the density of the patch image and the time of calibration. Therefore, in the image sensor 1 of Example 1, there is no need to limit the output range of the internal reference plate by changing the light amount between the time of density detection and the time of detecting the internal reference plate 16, and thus the above-described trade-off is not established. Accordingly, it is possible to perform density calibration and detection with high accuracy. In addition, in the image sensor 1 of Example 1, there is no need to open or close a shutter and only the current values need to be controlled. Therefore, an increase in speed may be achieved. Furthermore, since a mechanism of opening and closing a shutter is unnecessary, cost may be reduced, and a configuration which is not easily broken and has high reliability may be realized.

Moreover, in the image sensor 1 of Example 1, the internal reference plate 16 is rotatably supported centered on the rotation center 16b. Therefore, even when the LED 6 and the second photodiode 12 have individual differences and production lot differences therebetween, the differences may be easily adjusted.

(Modified Example)

While the examples of the invention have been described above, the invention is not limited to the above-described embodiments, and various modifications may be made without departing from the scope of the concept of the invention described in the appended claims. Modified Examples (H01) to (H08) of the invention are exemplified as follows.

(H01) In the above-described example, the copying machine U is exemplified as an example of the image forming apparatus. However, the image forming apparatus is not limited thereto, and may also be applied to a printer, a fax machine, a multi-function peripheral having multiple functions, and the like.

(H02) Specific materials, numerical values, and the like exemplified in the above-described example may be arbitrarily changed according to the design, performance, and the like. That is, the second intensity is not limited to twice the first intensity and may be greater than twice the first intensity or may be greater than the first intensity and less than twice the first intensity.

(H03) In the above-described example, the LED 6 is exemplified as the light-emitting unit. However, an arbitrary light-emitting device that may adjust a light amount may also be used. Therefore, control parameters for changing the light-emitting intensity are not limited to control of current values, and the control parameters may be changed according to the configuration of the light-emitting device. Similarly, although the photodiodes 11 and 12 are exemplified as the light-receiving unit, an arbitrary light-receiving device that may receive and output light may also be used.

(H04) In the above-described example, the case where the image sensor 1 is used to detect the density of the patch image is exemplified. However, the image sensor 1 is not limited thereto. For example, the image sensor 1 may be applied to a unit that measures a color shift between Y, M, C, and K and corrects the color shift by detecting the position of the patch image.

(H05) In the above-described example, the configuration capable of forming an image of four colors of Y, M, C, and K is provided. However, the configuration is not limited thereto. An image forming apparatus of forming three or less colors, a single color, or five or more colors may be applied.

(H06) In the above-described example, a configuration of detecting density by using both the specular reflected light and diffuse reflected light may preferably be employed. However, a sensor that uses any one of the specular reflected light and diffuse reflected light may also be applied.

(H07) In the above-described example, the configuration in which the intermediate image transfer belt B that is an intermediate transfer medium is used as an example of a medium is exemplified, but the example is not limited thereto. For example, a configuration which employs direct transfer from each of the photoconductors PRy to PRk to a sheet S as an example of the medium may also be applied. Therefore, the image sensor 1 may be provided to oppose each of the photoconductors PRy to PRk.

(H08) In the above-described example, the configuration in which the light-receiving device and the light-emitting device have a shell (mold) shape are provided. However, the example is not limited thereto. A light-receiving device and a light-emitting device having a different shape from the shell shape, such as a surface-mounted type (chip) may also be applied as an optical path of the present suggestion.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image detection device comprising:
 a light-emitting unit that emits light toward an image holding member in which an image is held on a surface;
 a first light-receiving unit that is disposed at a position where specular reflected light of the light emitted toward the image holding member is received;

a second light-receiving unit that is disposed at a position where diffuse reflected light of the light emitted toward the image holding member is received and detects light having an intensity that is equal to or higher than a predetermined intensity;

a light-emission control unit that controls an intensity of the light emitted by the light-emitting unit, controls the intensity of the light emitted by the light-emitting unit to a first intensity that is predetermined in a case where the image held on the image holding member is detected, and controls the intensity of the light emitted by the light-emitting unit to a second intensity that is higher than the first intensity in a case where a reference of a density is detected; and a reference member that is disposed at a position through which light having an intensity that is less than the intensity detectable by the second light-receiving unit passes in a case of the first intensity and through which light having an intensity that is equal to or higher than the intensity detectable by the second light-receiving unit passes in a case of the second intensity, and includes a reference surface that reflects the light emitted by the light-emitting unit toward the second light-receiving unit in the case of the second intensity and has the density that is the predetermined reference, the reference member being rotatably supported centered on a rotation center.

2. The image detection device according to claim 1, wherein the light-emission control unit controls the intensity of the light by controlling a current supplied to the light-emitting unit, and the light-emission control unit sets a second current value that is supplied in the case of the second intensity to be equal to or higher than twice as large as a first current value that is supplied in the case of the first intensity.

3. The image detection device according to claim 1, wherein, when a first detection value obtained by detecting the light having the first intensity irradiating the image held on the image holding member using the second light-receiving unit is set to be V1, a second detection value obtained by detecting the light having the first intensity irradiating the image holding member where no image is held using the second light-receiving unit is set to be V2, a third output value obtained by detecting the light having the second intensity irradiating the reference surface using the second light-receiving unit is set to be V3, and a density of the image is set to be V4, the density of the image is detected by calculating V4=(V1−V2)/V3.

4. An image forming apparatus comprising:

an image holding member that holds an image on a surface; and the image detection device according to claim 1, that detects the image on the surface of the image holding member.

5. The image detection device according to claim 1, further comprising a window portion disposed so as to allow the emitted light to pass, wherein the second light receiving unit does not overlap, along a belt-length direction, the window portion.

6. The image detection device according to claim 1, wherein the intensity detected by the second light-receiving unit is non-zero.

7. The image detection device according to claim 2, wherein, when a first detection value obtained by detecting the light having the first intensity irradiating the image held on the image holding member using the second light-receiving unit is set to be V1, a second detection value obtained by detecting the light having the first intensity irradiating the image holding member where no image is held using the second light-receiving unit is set to be V2, a third output value obtained by detecting the light having the second intensity irradiating the reference surface using the second light-receiving unit is set to be V3, and a density of the image is set to be V4, the density of the image is detected by calculating V4=(V1−V2)/V3.

8. An image forming apparatus comprising:

an image holding member that holds an image on a surface; and the image detection device according to claim 2, that detects the image on the surface of the image holding member.

* * * * *